E. T. DINKINS.
TRAP.
APPLICATION FILED JUNE 20, 1921.

1,420,823.

Patented June 27, 1922.

E.T. Dinkins  INVENTOR.

BY Jesse R. Stone

ATTORNEY.

UNITED STATES PATENT OFFICE.

EARL T. DINKINS, OF HOUSTON, TEXAS.

TRAP.

1,420,823.

Specification of Letters Patent.  Patented June 27, 1922.

Application filed June 20, 1921. Serial No. 478,839.

*To all whom it may concern:*

Be it known that I, EARL T. DINKINS, a citizen of the United States, residing at Houston, Harris County, Texas, have invented a certain new and useful Improvement in Traps, of which the following is a full, clear, and exact description, such as will enable others skilled in the art to which it appertains to make and use the same.

My invention relates to traps and has particular application to traps for the smaller animals such as rats, weasels, rabbits, etc.

The object of my invention is to provide a trap which will be adapted to automatically set itself after it has been operated and which will keep the animal alive without injury.

Figure 2:
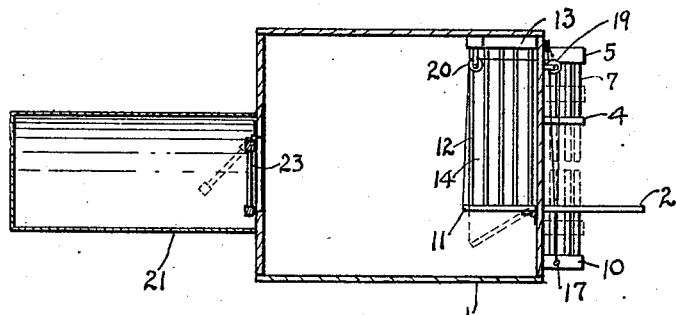
Figure 1:
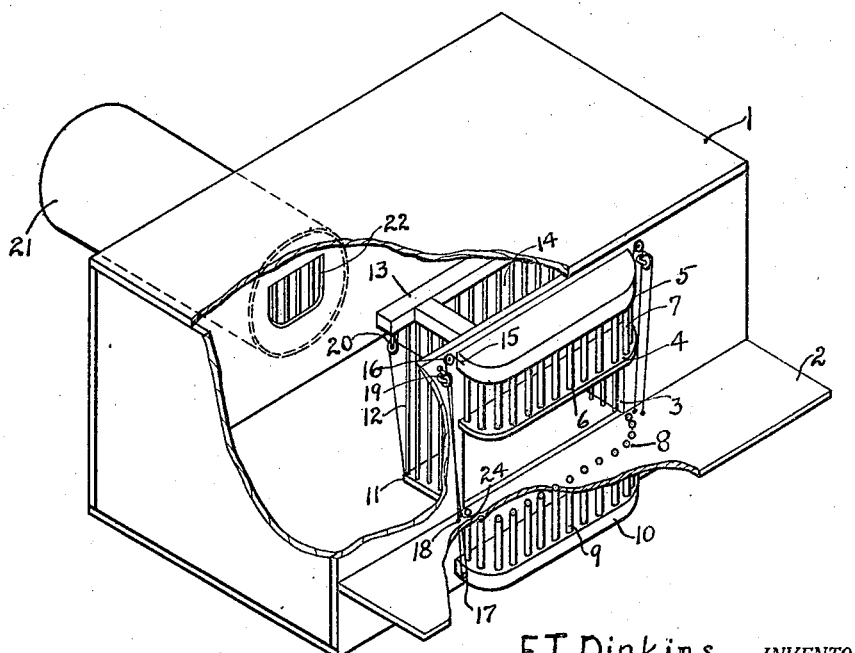

Referring to the drawing herewith, wherein like parts are designated by like numerals of reference in both the views: Fig. 1 is a perspective view of my trap, parts being broken away for further clearness. Fig. 2 is a transverse section through one end of my device, the rear side being in central transverse section.

My trap may be made of a rectangular box 1 but it obviously may be made in any other preferred form. I have shown the box as having a step or support 2 extending from the front side of the box at a short distance above the ground. Centrally above this step is an opening 3 having an overhanging shelf 4 which forms a guide for a dropping door 5. It is provided for this purpose with a row of small openings 6, adjacent the margin of the shelf, through which may slide the rods 7 secured in an upper plate of the door 5.

The supporting step 2 is also pierced by a curved row of holes 8, inclosing the opening 3 and furnishing guides for the rods 9 of the lower door 10. These rods are mounted in a lower plate similar to that of the upper door 5.

Immediately inside the door or opening 3 I have hinged a small platform or pedal 11 When this pedal is in its normal raised position it is upon a level with the outer platform or step 2, and rests its upper surface against the lower ends of a series of vertical rods 12 which are secured at their upper ends in a frame 13 secured to the upper wall of the box 1. This frame with the downwardly extending rods 12 form a small cage or chamber 14 immediately within the door 3.

Both of the doors 5 and 10 are slidably fixed to the front side of the box 1. The plate 5 of the upper door is held in raised position by means of a small line or cable 15, one end of which is secured at each end of the plate 5. This cable is passed over a small roller or pulley 16, mounted on the upper front face of the cage, and from this pulley the line passes downwardly through an opening 24 in the platform 2, and is secured at 17 on the lower end of the plate of the door 10. There is secured at the point 17 another line or cable which runs upwardly through a second opening 18 in the platform 2 and passes over a pulley 19 at the upper end of the box vertically above the point 17, and from there the cable passes through an opening in the front of the box and extends directly inward to pass about another pulley 20 on the side end of the framework 13, and from there the line is extended downwardly and secured to the inner end of the hinged pedal 11.

As has been previously noted, there are two sets of these lines, one at each side of the door 3.

I have so arranged the comparative weights of the doors 5 and 10 and the pedal 11 that the lower door 10 shall be slightly heavier than the combined weight of the upper door 5 and the pedal 11.

The operation of the device will be practically as follows: Some bait is intended to be secured within the box 1 of the trap, and within the chamber 14, immediately inside the door. An animal in entering the door to get at the bait will step on the hinged platform or pedal 11, and his weight will be sufficient to cause the pedal to drop into the dotted line position shown in Fig. 2. The animal will therefore be precipitated downward into the box portion of the trap. When the pedal 11 drops, it will by means of the line attached thereto raise the lower door 10. The lower plate with the upright rods thereon will be forced upwardly, the rods passing through the guide openings 8 in the platform so as to partly close the opening 3. As the lower door is raised, the connections through the line 15 with the upper door will be loosened to such an extent that the upper door will drop by gravity, the rods 7 passing through the openings in the plate 4, so that the lower ends of the rods 7 and the upper ends of the rods 9 will come together to close the door. This door will be held closed as long as the pedal is in its dropped position. As soon, however, as the animal has stepped off of the pedal 11 it will rise and allow the lower door 10 to drop by its own weight, this weight being sufficient to throw the pedal 11 back upwardly into closed position, and to draw the door 5 upwardly into the position shown in Fig. 1.

I have also shown as an attachment for my trap, an auxiliary chamber 21. This chamber, which I have indicated generally by a cylindrical container projecting backwardly from the rear end of the trap, has an opening 22 in the rear side of the trap leading into it. Immediately above the opening 22 I have hinged a gate 23. This gate may be pushed upwardly by an animal caught in the trap, and allow the entrance of the animal to the chamber 21, after which the gate will drop by its own weight and prevent the animal from getting back into the box 1 of the trap. I have found that when an animal has been caught in a trap such as I have shown, he will immediately seek an exit from the trap, and will enter almost any opening which he may find. This tendency will cause the animal to push through the gateway 22 into the auxiliary chamber 21, and will thus relieve the main body of the trap and thus avoid any tendency of the entrapped animal to scare away others.

It will be noted that the action of my trap depends partly upon the even balancing of the doors. The lower door 10 must be so weighted that it will be just sufficient to raise by means of the lines and pulleys described, the upper door 5 and the pedal 11. Thus, small animals such as mice will be of sufficient weight to overcome the nice balance between these parts, and will be sufficient to depress the pedal to entrap the animal and close the doors 5 and 10. When the animal has dropped off from the pedal 11, the weight of the lower door 10 will be sufficient to draw the other two parts into their position as shown in Fig. 1, and the trap will be set to receive another victim.

The advantages of this type of construction lie largely in the fact that the trap will automatically be set after it has been tripped, and may thus act to capture a large number of animals at one setting. Furthermore, animals thus received within the trap are maintained against injury, and may be kept alive. The device is simple in construction, and will not easily get out of order.

Having thus described my invention, the further advantages of which will be obvious, what I claim is new and desire to protect by Letters Patent is:

1. A trap comprising a closed chamber and having an opening in one side thereof; a platform in front of said opening, a pedal in said opening adapted to be tripped by the weight of an animal, upper and lower doors slidable relative to said opening, said doors being operated by the dropping of said pedal.

2. In a trap, a closed box having an opening on one side, a lower door for said opening, an upper door, a pedal within said opening hinged to drop downwardly, means connecting said pedal and said lower door to raise said door when said pedal drops and means connecting said lower door and said upper door to cause said upper door to drop by its own weight when said lower door closes.

3. In a trap, a closed box having an opening in one side, a pedal within said opening, hinged to drop downwardly, a sliding door above said opening, a sliding door below said opening, means connecting said lower door and said pedal to normally hold said pedal in horizontal position and means connecting said lower door with said upper door to normally hold said upper door in raised position.

4. In a trap, a closed box having an opening in one side, a pedal in said box below said opening, doors for closing said opening, connections between said doors and said pedal adapted to normally hold said pedal in raised position, whereby, when said pedal is depressed, said doors will be closed, the weight of said doors being so balanced as to open the said doors and raise said pedal, when pressure on said pedal is relieved.

5. In a trap, a closed box having an opening in one side, a hinged pedal within said opening, a door below said opening and slidable relative to said opening, a line connecting said door and pedal whereby the weight of said door will hold said pedal in raised position, but pressure on said pedal will depress the pedal and close the door and a screen chamber around said pedal when same is in raised position.

In testimony whereof, I hereunto affix my signature this the 17th day of June, A. D., 1921.

EARL T. DINKINS.